(12) United States Patent
Cornea

(10) Patent No.: US 7,069,951 B2
(45) Date of Patent: Jul. 4, 2006

(54) PROPORTIONAL SOLENOID VALVE FOR A CAMSHAFT ADJUSTING DEVICE OF MOTOR VEHICLES

(75) Inventor: Marius Cornea, Lohr/Main (DE)

(73) Assignee: Hydraulik-Ring GmbH, Marktheidenfeld (DE)

( * ) Notice: Subject to any disclaimer, the term of this patent is extended or adjusted under 35 U.S.C. 154(b) by 0 days.

(21) Appl. No.: 10/707,807

(22) Filed: Jan. 14, 2004

(65) Prior Publication Data
US 2004/0163722 A1 Aug. 26, 2004

(30) Foreign Application Priority Data
Jan. 14, 2003 (DE) ................. 103 00 974

(51) Int. Cl.
*F15B 13/04* (2006.01)
(52) U.S. Cl. .................. 137/625.68; 137/625.65; 137/625.69
(58) Field of Classification Search ........... 137/625.65, 137/625.68
See application file for complete search history.

(56) References Cited

U.S. PATENT DOCUMENTS

| | | | |
|---|---|---|---|
| 3,776,273 A | 12/1973 | Schmiel | |
| 4,095,628 A | 6/1978 | Laub, III | |
| 4,274,504 A | 6/1981 | Kawabata et al. | |
| 4,491,153 A * | 1/1985 | Bartholomaus | 137/625.65 |
| 4,537,164 A | 8/1985 | Ajiki et al. | |
| 5,474,105 A | 12/1995 | Able et al. | |
| 5,878,782 A * | 3/1999 | Nakajima | 137/625.65 |
| 5,992,294 A | 11/1999 | Seddon | |
| 6,289,921 B1 * | 9/2001 | Neuhaus et al. | 137/625.65 |
| 6,315,268 B1 * | 11/2001 | Cornea et al. | 137/625.65 |
| 6,453,947 B1 | 9/2002 | Inoue et al. | |
| 6,527,249 B1 * | 3/2003 | Niimi et al. | 137/625.69 |
| 6,681,806 B1 * | 1/2004 | Isobe | 137/625.65 |
| 6,904,937 B1 * | 6/2005 | Fischer | 137/625.64 |

FOREIGN PATENT DOCUMENTS

WO WO 99/02866 * 1/1999

* cited by examiner

*Primary Examiner*—Ramesh Krishnamurthy
(74) *Attorney, Agent, or Firm*—Gudrun E. Huckett

(57) ABSTRACT

A proportional solenoid valve or a camshaft adjusting device of motor vehicles has a valve housing and a piston movably arranged in the valve housing and provided with at least one pressure medium passage. A solenoid part is connected to the valve housing and acts on the piston. The valve housing has at least one working connector, a tank connector, and a pressure connector configured to supply a pressure medium into the piston. A leakage passage is provided that connects the pressure connector at all times to the at least one working connector.

18 Claims, 3 Drawing Sheets

PROPORTIONAL SOLENOID VALVE FOR A CAMSHAFT ADJUSTING DEVICE OF MOTOR VEHICLES

BACKGROUND OF INVENTION

1. Field of the Invention

The invention relates to a proportional solenoid valve for a camshaft adjusting device of motor vehicles. The proportional solenoid valve comprises a valve housing in which a piston is slidably arranged and which comprises at least one working connector, a tank connector, and a pressure connector. Via the pressure connector, a pressure medium, preferably hydraulic oil, can be supplied to the piston. The piston is provided with at least one passage for the pressure medium.

2. Description of the Related Art

Camshaft adjusting devices are used for adjusting the fuel consumption of an internal combustion engine in accordance to the momentary power demand. In this connection, the stroke of the intake valves is adjusted such that the fuel quantity required for the momentary power demand is injected into the combustion chamber. In order to change the valve stroke, the camshaft is rotated relative to the crankshaft. For this purpose, an adjuster is provided that can be compared to a hydro cylinder. The hydraulic oil of the internal combustion engine is used as the pressure medium. The pressure oil source is the lubricant circuit of the internal combustion engine. The actuation of the adjuster is realized by means of the proportional solenoid valve.

Essentially two types of adjusters are used, i.e., helical gear adjusters and blade type adjusters. The pressure medium is supplied by the proportional solenoid valve by means of a rotary translator to the adjuster. The rotary translator exhibits leakage to a greater or lesser extent. It is a problem in this connection that the leakage volume between the two working connectors differs.

The helical gear adjusters have greater internal friction than the blade type adjusters. On the other hand, a certain friction is better for vibration damping. The proportional solenoid valves of the known camshaft adjusting devices must ensure a hydraulic clamping of the adjusting element. In the case of helical gear adjusters, the adjusting element is a piston while in the case of blade type adjusters a rotor with radially projecting blades is used as the adjusting element. In the case of helical gear adjusters it is sufficient to provide a run-off control for hydraulic clamping of the piston. The blade type adjusters, in combination with the rotary translators, exhibit relatively great leakage; this has the result that the adjusting element cannot be optimally clamped. An additional problem is that, when insufficient oil pressure is present in one of the pressure chambers of the adjuster, the locking mechanism is no longer released.

SUMMARY OF INVENTION

It is an object of the present invention to configure the proportional solenoid valve of the aforementioned kind such that the adjusting element is clamped optimally and the locking mechanism of the adjuster can be released at any time.

In accordance with the present invention, this is achieved in that the pressure connector is connected by at least one leakage passage to the working connector at all times.

In the proportional solenoid valve of the present invention, it is ensured by means of the leakage passage that the leakage that occurs within the system is reliably compensated. By means of this leakage passage, the working connector is always supplied with pressure medium, even when this working connector is closed. In this way, a certain pressure medium flow is achieved at all times, and this flow compensates external system leakages of the valve. In this way, it is ensured that the piston or rotor can be properly hydraulically clamped and that the locking mechanism in one of the chambers of the adjustor is reliably released.

DETAILED DESCRIPTION

Figure 1:
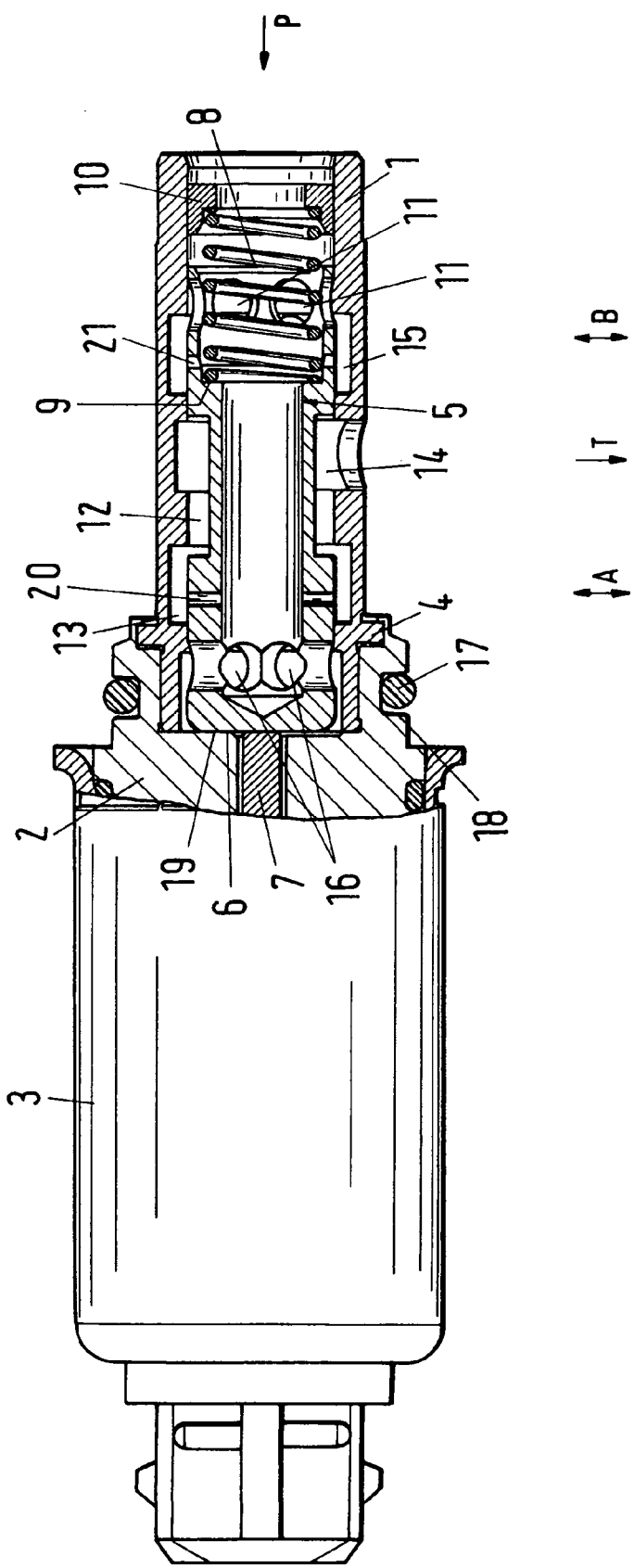
FIG. 1 shows in axial section a first embodiment of the valve according to the invention with axial pressure connector.

The valve is part of a camshaft adjusting device with which a variable valve control in internal combustion engines is enabled by a continuous rotation of the camshaft relative to the crankshaft. The relative movement between the camshaft and the crankshaft is realized, as is known in the art, by an adjuster that operates according to the principle of the hydro cylinder. The pressure oil source is the lubricant circuit of the motor. The adjuster is actuated by means of the valve that is embodied as a proportional solenoid valve. The valve has a valve housing 1 that is connected to a housing 2 of the solenoid part 3. In the embodiment illustrated in the drawings, the valve housing 1 is provided at a spacing from a first end with a radially outwardly projecting flange 4. This flange 4 rests against an end face of the housing 2. As is conventional in the art, the connection between the valve housing 1 and the solenoid part housing 2 is realized, for example, by a crimping process by which a part of the housing 2 is crimped about the flange 4 of the valve housing 1.

In the valve housing 1 a hollow piston 5 is slidably arranged. The piston 5 is provided with a closed bottom 6 at its end facing the solenoid part 3. The plunger 7 of the solenoid part 3 rests against the outer side of the bottom 6. The hollow piston 5 can be axially moved by the plunger 7 against the force of at least one coil spring 8. The coil spring 8 projects into the hollow piston 5 and is supported with a first end on the radially inwardly oriented shoulder surface 9 of the inner wall of the hollow piston 5. The second end of the pressure spring 8 rests against the locking ring 10 inserted into the valve housing 1. Advantageously, it is screwed or pressed into the valve housing 1 so that, by screwing or pressing the locking ring 10 into the housing 1 at different depths, the pretensioning force of the pressure spring 8 can be adjusted continuously. The end of the valve housing 1 that is provided with the locking ring 10 is connected to a pressure medium source via which the pressure medium, preferably hydraulic oil, is supplied at pressure P to the valve housing 1 and the hollow piston 5.

The hollow piston 5 is guided within the valve housing 1 and has a pressure medium passage with at least one radial bore 11 proximal to the end facing the locking ring 10. Advantageously, several radial bores 11 are uniformly distributed about the circumference of the hollow piston 5.

The hollow piston 5 is also provided at approximately half its length with a circumferential groove 12 so that the hollow piston 5 in the area of its groove 12 is spaced from the inner wall of the valve housing 1. As a result of this circumferential groove 12, the hollow piston 5 has a thin wall in this area and has a greater wall thickness in the adjoining areas.

The valve housing 1 is connected to two working connectors A and B and a tank connector T. Depending on the position of the hollow piston 5, the pressure medium axially supplied via the pressure connector P is supplied to one of the two working connectors A and B. In the area of the connectors A, B, and T, the valve housing 1 can be provided at its inner side with a circumferential groove 13 to 15, respectively, into which at least one radial bore provided in the valve housing 1 opens.

At a minimal spacing from the bottom 6, the hollow piston 5 is provided with a pressure medium passage in the form of radial bores 16 that are advantageously uniformly distributed about the circumference of the hollow piston 5.

The proportional solenoid valve is mounted in a mounting space (not illustrated) provided in the internal combustion engine or the vehicle and is sealed by means of at least one annual seal 17. This seal is positioned in an annular groove 18 in the outer wall of the housing 2 of the solenoid parts 3.

In the initial position illustrated in FIG. 1, the solenoid is not excited so that the plunger 7 is retracted and the bottom 6 of hollow piston 5 rests against a radial surface 19 of the housing 2. The pressure medium supplied via the pressure connector P flows into the hollow piston 5 and can flow via the radial bores 11 to the working connector B of the adjuster. In this way, as is known in the art, a piston or a rotor of the adjuster is moved accordingly in order to adjust the camshaft relative to the crankshaft. The pressure medium that is displaced by the adjustment of the piston or the rotor of the adjuster flows via the tank connector T of the proportional solenoid valve back to the tank. In this position of the hollow piston 5, the working connector A is separated from the pressure connector P. In order to obtain a compensation of the external system leakage of the valve, the hollow piston 5 is provided with at least one leakage bore 20 penetrating its wall. Via the at least one leakage bore 20, a minimal amount of pressure medium can flow at all times to the working connector A, even when the hollow piston 5 blocks this working connector A, as illustrated in the drawing. Advantageously, several such leakage bores 20 are provided in the hollow piston 5 and distributed about the circumference of the hollow piston 5. Through this leakage bore 20 the leakage medium flows also to the tank connector T and can thus return to the tank.

When the solenoid is excited, the plunger 7 is extended and moves the hollow piston 5 against the force of the pressure spring 8. Depending on the travel stroke of the hollow piston 5, the flow cross-section of the pressure medium into the working connector P can be adjusted or closed completely. When the hollow piston 5 has been moved by means of the plunger 7 sufficiently away from the position illustrated in the drawings, the working connector B is closed relative to the pressure connector P and, instead, the working connector A is opened. The pressure medium can now flow via the pressure connector P and the radial bores 16 out of the hollow piston 5 to the working connector A. In this case, the piston or the rotor of the adjuster is loaded on the other side by the pressure medium so that the piston or the rotor is moved in the other direction. In this way, the camshaft is rotated in a direction that is different than the direction when the pressure medium is supplied to the adjuster via the working connector B. The pressure medium that is contained in the opposite pressure chamber of the adjuster flows via the tank connector T back to the tank.

In order to enable in this position of the hollow piston a compensation of the external system leakage of the valve, the hollow piston 5 is provided in the area of the working connector B of the valve housing 1 with at least one leakage bore 21 penetrating its wall. Advantageously, the hollow piston 5 has several leakage bores 21 distributed about its circumference. Through these leakage bores, a minimal amount of the pressure medium supplied via the pressure connector P can also reach the working connector B when the hollow piston 5 has closed the connection to the pressure connector P. Since in this situation the working connector B is also connected to the tank connector T, a portion of the leakage medium flows also into the tank connector T.

In the described embodiment, leakage compensation is provided at both working connectors A and B. Depending on the adjuster, the rotary translator, the type of motor mounting, the electronic devices and the like, the leakage compensation can also be provided only at one of the working connectors A and B. In this case, the hollow piston 5 only has the leakage bore 20 or the leakage bore 21.

In the illustrated embodiment, the leakage bores 20 and 21 have the same flow cross-section. Of course, it is also possible to provide the leakage bores 20 and 21 so as to have different flow cross-sections so that an optimal adaptation to the mounting conditions is possible as needed.

The leakage bores 20, 21 are configured as nozzles. They can also be in the form of an orifice. The leakage compensation is realized advantageously as a function of the temperature.

The described proportional solenoid valve has an asymmetric characteristic line and has an increased leakage in the overlap area.

When providing differently sized leakage bores 20, 21, an adaptation of the leakage compensation to different leakage quantities is possible, as is required in the case of a rotary translator for guiding the pressure medium from the proportional solenoid valve to the adjuster.

Since by means of the leakage bores 20, 21, a pressure medium is always present in the adjusting chambers of the adjuster, it is ensured that the locking mechanism of this adjuster can be reliably released. When the solenoid is no longer supplied with current, the hollow piston 5 is returned by the force of the pressure spring 8 into the initial position illustrated in the drawing. The hollow piston 5 also returns the plunger 7 into its initial position.

Figure 2:
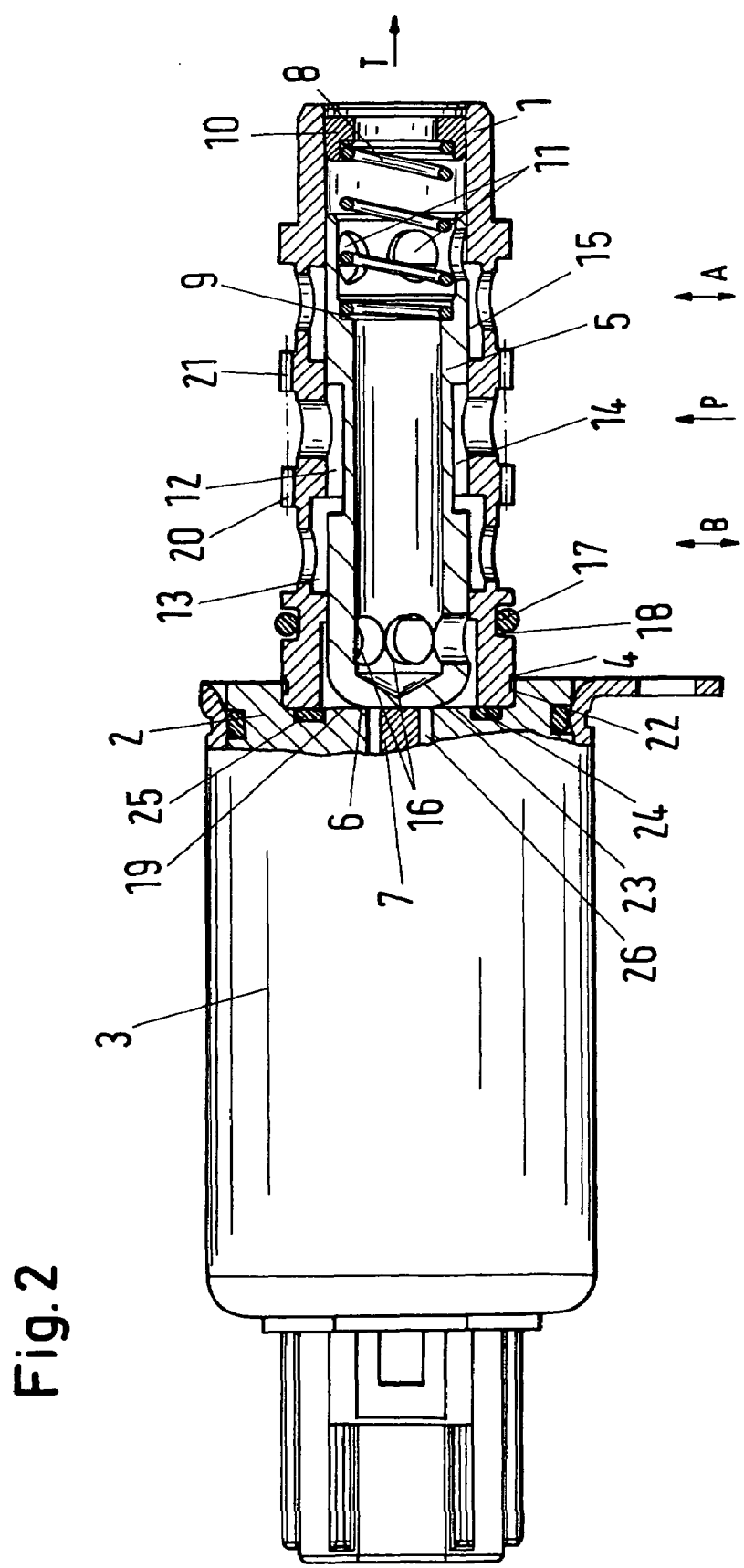
FIG. 2 shows in axial section a second embodiment of the valve according to the invention with radial pressure connector.
Figure 3:
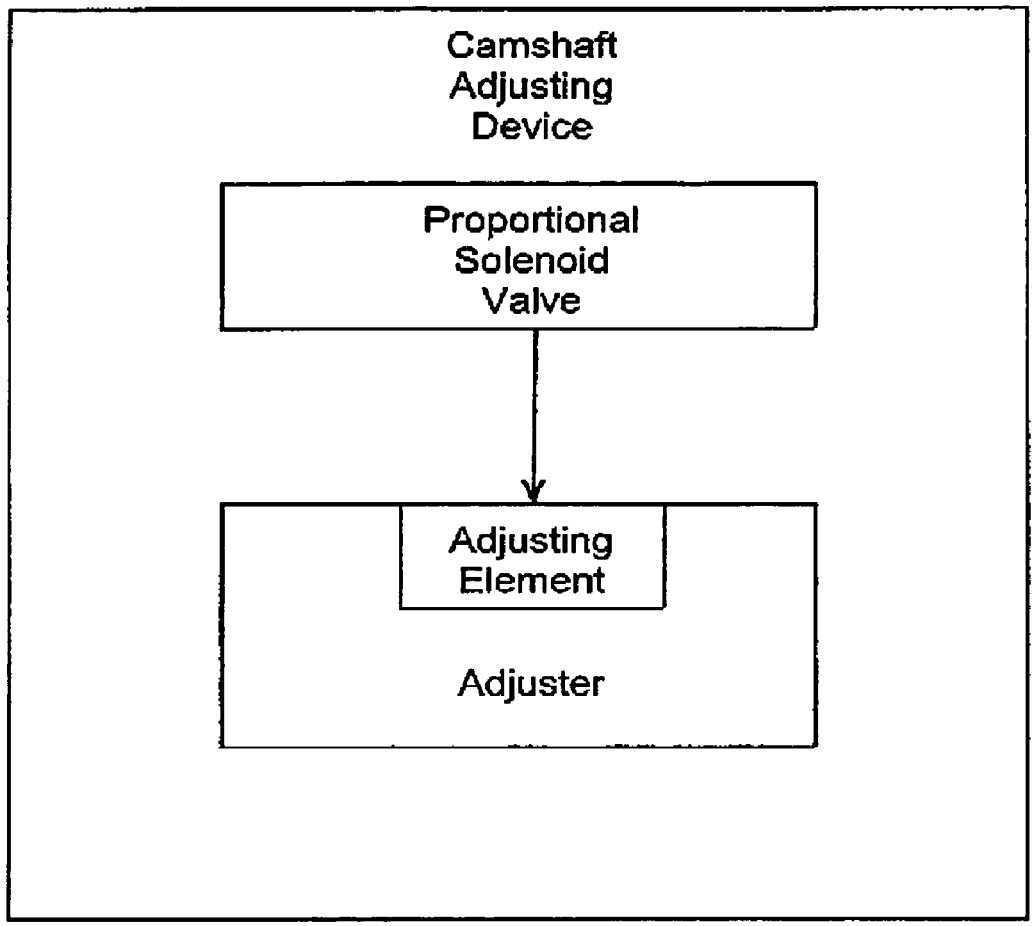
FIG. 3 shows schematically a camshaft adjusting device comprising a proportional solenoid valve and an adjuster with adjusting element acted on by the proportional solenoid valve as symbolized by the arrow.

The embodiment illustrated in FIG. 2 differs from the preceding embodiment in that the pressure connector P is provided within the valve housing 1. In this way, the pressure medium is radially supplied to the pressure connector P. The tank connector T is provided at the end of the valve housing 1 having the securing ring 10. The pressure medium displaced by the movement of the piston 5 flows thus axially via the tank connector T of the proportional solenoid valve to the tank.

In the position illustrated in FIG. 2 of the hollow piston 5, the pressure connector P is connected via the groove 14 to the working connector B. The other working connector A is connected by a pressure medium passage in the form of radial bores 11 provided in the hollow piston 5 to the tank connector T.

When the solenoid is excited, the plunger 7 is extended so that the hollow piston 5 is moved against the force of the pressure spring 8. When the hollow piston 5 has been sufficiently moved, the working connector B is closed relative to the pressure connector P and the connection to the working connector A is instead opened. The connection between the working connector A and the tank connector T is closed. Instead, the radial bores 16 in the hollow piston 5 reach the area of the working connector B so that the pressure medium can flow via the pressure medium passage in the form of the radial bores 16 and the hollow piston 5 to the tank connector T. The valve housing 1 is provided at its exterior at the level of the lands 27 between the working connectors A, B and the pressure connector P, respectively, with the leakage passages 20, 21. They are, for example, formed as bores and are distributed about the circumference of the valve housing 1. In principle, one bore 20 or 21 is sufficient as a leakage passage.

In contrast to the preceding embodiment, the housing 2 of the solenoid part 3 is provided at its end face with a recess 22 into which the valve housing 1 projects with one end. In the bottom 23 of the recess 22 an annular groove 24 is provided that receives an annular seal 25. The valve housing 1 rests with its end face against this seal 25. The valve housing 1 is pressed with its end into the recess 22. An axial bore 26 opens into the bottom 23 of the recess 22. The plunger 7 is arranged in this axial bore 26. As in the preceding embodiment, the plunger 7 rests against the closed bottom 6 of the hollow piston 5.

In other respects, this embodiment is identical to the embodiment according to FIG. 1.

The valve housings 1 of the two described embodiments are interchangeable.

While specific embodiments of the invention have been shown and described in detail to illustrate the inventive principles, it will be understood that the invention may be embodied otherwise without departing from such principles.

What is claimed is:

1. A proportional solenoid valve for a camshaft adjusting device of motor vehicles, the proportional solenoid valve comprising:
    a valve housing;
    a piston movably arranged in the valve housing and provided with at least one pressure medium passage;
    a solenoid part connected to the valve housing and acting on the piston;
    the valve housing having at least one working connector, a tank connector, and a pressure connector configured to supply a pressure medium into the piston;
    one or more leakage passages connecting the pressure connector at all times to the at least one working connector;
    wherein the piston is a hollow piston having a wall and wherein the at least one pressure medium passage is at least one opening penetrating the wall;
    wherein several of the openings penetrating the wall are provided and wherein a first and a second one of the working connectors are provided, wherein the first and second working connectors each have at least one of the openings penetrating the wall correlated therewith.

2. The valve according to claim 1, wherein the first and second working connectors each have at least one of the leakage passages connecting the first and second working connectors to the pressure connector at all times, respectively.

3. The valve according to claim 2, wherein the at least one leakage passage of the first working connector and the at least one leakage passage of the second working connector have identical flow cross-sections.

4. The valve according to claim 2, wherein the at least one leakage passage of the first working connector and the at least one leakage passage of the second working connector have different flow cross-sections.

5. A proportional solenoid valve for a camshaft adjusting device of motor vehicles, the proportional solenoid valve comprising:
    a valve housing;
    a piston movably arranged in the valve housing and provided with at least one pressure medium passage;
    a solenoid part connected to the valve housing and acting on the piston;
    the valve housing having at least one working connector, a tank connector, and a pressure connector configured to supply a pressure medium into the piston;
    one or more leakage passages connecting the pressure connector at all times to the at least one working connector;
    wherein the one or more leakage passages are comprised of openings provided in the valve housing;
    wherein the valve housing has a land between the at least one working connector and the pressure connector and wherein the one or more leakage passages are bores in the land.

6. A proportional solenoid valve for a camshaft adjusting device of motor vehicles, the proportional solenoid valve comprising:
    a valve housing;
    a piston movably arranged in the valve housing and provided with at least one pressure medium passage;
    a solenoid part connected to the valve housing and acting on the piston;
    the valve housing having two working connectors, a tank connector, and a pressure connector configured to supply a pressure medium into the piston;
    one or more leakage passages connecting the pressure connector at all times to the two working connectors.

7. The valve according to claim 6, wherein the one or more leakage passages are provided in the piston.

8. The valve according to claim 6, wherein the one or more leakage passages are provided in the valve housing.

9. The valve according to claim 6, wherein the piston is a hollow piston having a wall and wherein the at least one pressure medium passage is at least one opening penetrating the wall.

10. The valve according to claim 6, wherein the at least one leakage passage is a nozzle.

11. The valve according to claim 6, wherein the one or more leakage passages are openings penetrating a wall of the piston.

12. The valve according to claim 6, wherein the one or more leakage passages are comprised of openings provided in the valve housing.

13. The valve according to claim 6, wherein the one or more leakage passages are an orifice.

14. The valve according to claim 6, wherein the piston has several of the leakage passages distributed circumferential about the piston.

15. The valve according to claim 6, wherein the one or more leakage passages are positioned adjacent to the at least one pressure medium passage.

16. The valve according to claim 6, wherein the piston has a closed bottom and wherein the solenoid part has a plunger, wherein the closed bottom of the piston rests against the plunger.

17. A camshaft adjusting device for motor vehicles, comprising:
- an adjuster having an adjusting element;
- a proportional solenoid valve acting on the adjusting element for adjusting the adjusting element;
- the proportional solenoid valve comprising a valve housing provided with at least one working connector, a tank connector, and a pressure connector;
- the proportional solenoid valve comprising a piston movably arranged in the valve housing;
- the pressure connector adapted to supply a pressure medium into the piston;
- the piston having at least one passage for the pressure medium;
- one or more leakage passages connecting the pressure connector at all times to the at least one working connector for hydraulically clamping the adjusting element.

18. A camshaft adjusting device for motor vehicles, comprising:
- an adjuster having an adjusting element;
- a proportional solenoid valve acting on the adjusting element for adjusting the adjusting element;
- the proportional solenoid valve comprising a valve housing provided with two working connectors, a tank connector, and a pressure connector;
- the proportional solenoid valve comprising a piston movably arranged in the valve housing;
- the pressure connector adapted to supply a pressure medium into the piston;
- the piston having at least one passage for the pressure medium;
- one or more leakage passages connecting the pressure connector at all times to the two working connectors for hydraulically damping the adjusting element.

* * * * *